United States Patent
Gomez et al.

(10) Patent No.: US 8,514,329 B2
(45) Date of Patent: Aug. 20, 2013

(54) JITTER ESTIMATION FOR MPEG RECEIVERS

(75) Inventors: Anton Gomez, Madrid (ES); Yari Adan Petralanda, Algete (ES)

(73) Assignee: Motorola Mobility LLC, Libertyville, IL (US)

(*) Notice: Subject to any disclaimer, the term of this patent is extended or adjusted under 35 U.S.C. 154(b) by 103 days.

(21) Appl. No.: 13/149,458

(22) Filed: May 31, 2011

(65) Prior Publication Data

US 2012/0307158 A1 Dec. 6, 2012

(51) Int. Cl.
*H04N 7/00* (2006.01)
*H04N 11/00* (2006.01)

(52) U.S. Cl.
USPC .......................................................... 348/497

(58) Field of Classification Search
USPC ............... 348/497; 378/240.26, 240.28, 371; 375/240.26, 240.28, 371
See application file for complete search history.

(56) References Cited

U.S. PATENT DOCUMENTS

| | | | |
|---|---|---|---|
| 5,598,415 A | 1/1997 | Nuber et al. | |
| 5,640,388 A | 6/1997 | Woodhead et al. | |
| 5,774,497 A | 6/1998 | Block et al. | |
| 5,790,543 A | 8/1998 | Cloutier | |
| 5,883,924 A | 3/1999 | Siu et al. | |
| 6,377,588 B1 * | 4/2002 | Osaki ............................. | 370/508 |
| 6,628,711 B1 | 9/2003 | Mathew et al. | |
| 6,650,719 B1 | 11/2003 | Baker | |
| 6,724,825 B1 | 4/2004 | Nemiroff et al. | |
| 7,012,982 B1 | 3/2006 | Basch et al. | |
| 7,733,919 B2 | 6/2010 | Liu et al. | |
| 2003/0126294 A1 | 7/2003 | Thorsteinson et al. | |
| 2003/0160897 A1 | 8/2003 | Park | |
| 2004/0153716 A1 | 8/2004 | Baker | |
| 2004/0228411 A1 | 11/2004 | Iwamura et al. | |
| 2004/0264577 A1 | 12/2004 | Jung | |
| 2005/0073961 A1 | 4/2005 | Paik et al. | |
| 2005/0177643 A1 | 8/2005 | Xu | |
| 2005/0237937 A1 | 10/2005 | Van Gestel | |
| 2005/0238061 A1 | 10/2005 | Woodward | |
| 2006/0120383 A1 | 6/2006 | Kim et al. | |
| 2006/0146815 A1 | 7/2006 | Tse | |
| 2006/0267640 A1 | 11/2006 | Travis | |
| 2007/0008044 A1 * | 1/2007 | Shimamoto ..................... | 331/57 |
| 2007/0140398 A1 | 6/2007 | Inoue et al. | |

(Continued)

OTHER PUBLICATIONS

H. Pandya, Application Note—AN101, Considerations for Measurement of PCR Jitter (2001) (available at http://www.pixelmetrix.com/datasheets/AppNote/AN101%20PCR%20Jitter.pdf).

*Primary Examiner* — Jefferey Harold
*Assistant Examiner* — Michael Teitelbaum

(57) ABSTRACT

A method is disclosed for estimating jitter in an MPEG receiver. An MPEG transport stream is received, including a plurality of packets. At least one of the plurality of packets includes a program clock reference (PCR) value. For each PCR value received, a current packet delay is calculated by subtracting a system time clock (STC) value of the MPEG receiver from the PCR value. If the current packet delay is greater than an upper boundary value or less than a lower boundary value, one or more of an upper and a lower boundary impact density is updated, and based on a comparison of the upper boundary impact density to the lower boundary impact density, one or more of the upper boundary value and the lower boundary value is updated. A current jitter value is calculated using the difference between the upper and the lower boundary value.

12 Claims, 4 Drawing Sheets

(56) References Cited

U.S. PATENT DOCUMENTS

| | | |
|---|---|---|
| 2008/0101518 A1 | 5/2008 | Kaizuka |
| 2008/0152064 A1 | 6/2008 | Kitagawa |
| 2008/0187008 A1 | 8/2008 | Burklin et al. |
| 2008/0187282 A1 | 8/2008 | Brady et al. |
| 2008/0219296 A1 | 9/2008 | Le Ludec et al. |
| 2008/0279226 A1 | 11/2008 | Laud |
| 2009/0121792 A1 | 5/2009 | Travis |
| 2009/0154546 A1 | 6/2009 | Liu |
| 2009/0245124 A1 | 10/2009 | Ichikawa et al. |
| 2010/0135325 A1 | 6/2010 | Kim et al. |
| 2010/0329141 A1* | 12/2010 | Apostol et al. ............ 370/252 |
| 2011/0023078 A1 | 1/2011 | Takatori et al. |
| 2011/0072484 A1* | 3/2011 | Horen ........................ 725/118 |

\* cited by examiner

JITTER ESTIMATION FOR MPEG RECEIVERS

BACKGROUND

The MPEG-2 transport stream is specifically designed for transmission in conditions that can generate data errors. MPEG transport packets each have a fixed length. Many programs, each with different components, may be combined in a transport stream. Examples of services that can be provided using the MPEG format are television services broadcast over terrestrial, cable television and satellite networks as well as interactive telephony-based services.

Commonly, transport streams carrying encoded digital video data are transmitted over packet-based networks, such as an Ethernet network. For example, each Ethernet frame may carry multiple transport stream packets. Due, for example, to variable transmission delays experienced by the Ethernet frames, individual transport stream packets suffer from variable delays at the receiving equipment, referred to as "jitter." Jitter deleteriously affects the processing and decoding of video data carried by the transport stream packets. As such, the receiving equipment must compensate for the jitter before distributing the transport stream packets.

In a digital video compression system, such as the MPEG-2 system, the digital video source is clocked at 27 MHz. The decoder (receiver) must generate the same 27 MHz clock such that the encoder and decoder clocks are synchronized. This clock is referred to as the system time clock (STC). The encoder and decoder each have a counter that is incremented on each tick of the STC. When the encoder and decoder STCs are synchronized, both counters are the same value.

The MPEG standard provides mechanisms for a receiver to synchronize its internal system time clock to that of the stream transmitter. This synchronization is necessary, for example, in order to avoid data loss due to buffer underruns or overflows in the receiver and consequently, noticeable artifacts in reproduced video content.

To synchronize with the decoder, the encoder sends a program clock reference (PCR) to the decoder. The PCR is a count which reflects the value of the encoder's STC for the associated program at the time the PCR bytes were inserted into the transport stream. Both PCR and STC are 42 bit counters composed by a base 33 bit counter that grows monotonically at 90 KHz and a 9 bit extension that grows monotonically at 27 MHz. When the packet with the PCR is received by the decoder, the decoder compares the 33 bit clock base of the PCR value with the 33 bit clock base of the decoder's STC counter value. If the two are the same, no adjustment is needed. If the two values are different, the decoder must either reset, speed up, or slow down its STC.

More specifically, an MPEG decoder uses the PCR to synchronize a decoder time clock with the encoder system clock. The lower nine bits of the 42-bit PCR provide a modulo-300 counter that is incremented at a 27 MHz clock rate (the "system clock rate"). At each modulo-300 rollover, the count in the upper 33 bits is incremented, such that the upper bits represent counts that occur at a 90 kHz rate. Since each program or service carried by the data stream may have its own PCR, the programs and services can be multiplexed asynchronously.

SUMMARY

In one embodiment of the present invention, a method is provided for estimating jitter in an MPEG receiver. An MPEG transport stream is received, including a plurality of packets. At least one of the plurality of packets includes a PCR value. For each PCR value received, a current packet delay is calculated by subtracting a STC value of the MPEG receiver from the PCR value. If the current packet delay is greater than an upper boundary value or less than a lower boundary value, one or more of an upper and a lower boundary impact density is updated, and based on a comparison of the upper boundary impact density to the lower boundary impact density, one or more of the upper boundary value and the lower boundary value is updated. A current jitter value is calculated using the difference between the upper and the lower boundary value.

DETAILED DESCRIPTION

Figure 1:
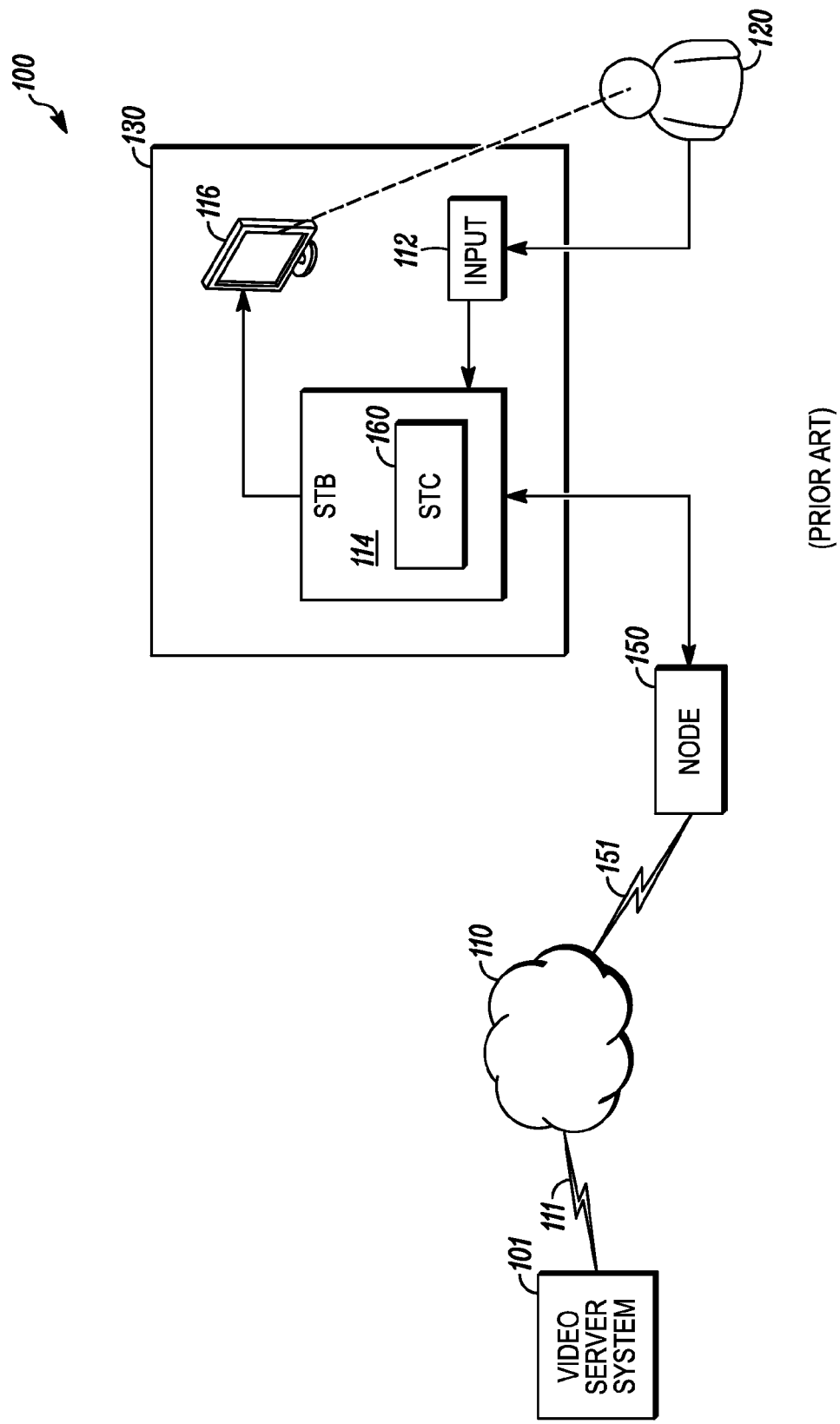
FIG. 1 illustrates an exemplary content distribution system suitable for practicing an embodiment of the present invention.

Aspects of the present invention provide a method for calculating an accurate estimate of PCR jitter of an incoming MPEG stream at the MPEG receiver side. Embodiments of the invention are applicable, for example, to MPEG-2, MPEG-4, and H.264 (MPEG-4 Part 10) content.

When MPEG transmitter and receiver clocks are perfectly (or reasonably closely) synchronized, jitter estimation is straightforward to obtain: it can be calculated as the maximum minus minimum observed PCR delay in the input signal (e.g., jitter=delay_max−delay_min), as measured against a local clock reference in the receiver.

Jitter estimation can be more difficult to obtain when both clocks are allowed to drift, because in such a case, absolute maximum and minimum observed delay do not represent jitter anymore. In order to use a simple formula such as jitter=delay_max−delay_min, one would need to estimate clock drift somehow and compensate for it before applying the formula.

However, conventional methods for estimating clock drift involve complex or at least non-trivial calculations. Examples of these approaches include the use of moving average, adaptive filtering, and linear/non-linear regression. In addition, conventional statistical methods do not converge fast enough on very high jitter environments (e.g., >100 ms) because signal-to-noise ratio is low.

An embodiment of the present invention allows fast and accurate estimation of MPEG PCR jitter on the receiver side that is not dependent on having transmission and reception clocks in sync. Specifically, an embodiment allows jitter estimation to happen before clock recovery algorithms have locked on the input signal and, in a further embodiment, typically before the first video frame is shown on screen. The algorithm also observes clock drift automatically, not needing to estimate the drift itself. That is, calculating the current jitter value does not require estimating a PCR to STC clock drift.

In an embodiment, we keep a window that is initiated to the first delay calculated, and whose width will grow equal to the observed jitter. For illustrative purposes, the upper boundary value of this window is sometimes referred to herein as delay_max and the lower boundary value is sometimes referred to herein as delay_min. At any point in time one boundary value is used for growing the jitter window, and the other one is used for compensating clock drift. Which one performs which role is determined dynamically as follows:

For every PCR delay obtained that is greater than delay_max or lower than delay_min, an embodiment recognizes a "boundary impact." An impact density means the number of boundary impacts per unit of time, and an embodiment keeps the count for impacts on the high and low boundaries separate; e.g., an upper boundary impact density and a lower boundary impact density. Impact densities are computed within a defined time window that is constantly updated, which allows dynamic adaptation to changes in clock drift. The boundary that has higher impact density is used for compensating clock drift. The boundary that has less impact density is used for growing the jitter window.

Jitter estimation, in an embodiment, can be used to dynamically adapt internal set-top box buffers to the received signal quality on every channel change in such a way that it minimizes visual artifacts (glitches) caused by excessive jitter on the new channel. The fast convergence provided by an embodiment allows buffer adaptation to occur before the first video frame is shown on screen after the user initiates a TV channel change. Because internal STB buffers are dynamic and adjusted before showing video, an embodiment can be used to minimize channel change time by reducing internal buffer size to the minimum necessary.

In a further application of an embodiment, jitter estimation can be used whenever the set-top-box is forced to cause a visible glitch due to streaming data unavailability. In such an embodiment, buffers will be readapted to accommodate the latest jitter estimation available for the current channel. This reduces the probability of subsequent glitches happening on the current channel, thus improving perceived video quality.

Before describing in detail embodiments that are in accordance with the present invention, it should be observed that the embodiments reside primarily in combinations of method steps and apparatus components related to a system and method for distributed recording of content. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 illustrates an exemplary content distribution system 100 suitable for practicing an embodiment of the present invention. However, it will be understood by a person having ordinary skill in the art that aspects of the invention can be practiced using a system having other than the specific features or limitations of the illustrative content distribution system 100 described herein.

Content distribution system 100 includes a video server system 101 and at least one distribution node 150. Server system 101 and node 150 are connected by an access network 110. For example, communication link 111 connects the server system 101 to the access network 110, and communication link 151 connects the node 150 to the access network 110. Content distribution system 100 also includes at least one client system 130.

Although FIG. 1 is a simplified depiction showing a illustrative single node 150 and an illustrative single client system 130, conventional content distribution systems typically include a plurality of nodes 150, not shown, each connected to a plurality of client systems 130, not shown. Each node 150 is connected to one or more client systems 130, for example, so that each node 150 can exchange data with and deliver content (e.g., from server system 101) downstream to its connected client systems 130.

The server system 101 stores, manages and delivers video content requested by a client system 130 via the access network 110. Access network 110 and communication links 111, 151 can include, for example, a transmission medium such as an optical fiber, a coaxial cable, a hybrid fiber coaxial (HFC) network, or other suitable transmission media or wireless telecommunications.

The server system 101 typically is located in a headend (not shown) or other suitable location within the content distribution system 100. The headend typically is a regional or local hub that is part of a larger service provider distribution system, such as a cable television distribution system. The content distribution system 100 typically is based on a central server architecture. In one such architecture, the server system 101 typically is centrally located with respect to a plurality of client systems 130, and connects to each client system 130 directly via a dedicated transmission medium (in some embodiments, communication link 151) of access network 110. In another such architecture, as depicted in FIG. 1, the server system 101 typically is centrally located with respect to one or more nodes 150, and connects to each node 150 directly via a dedicated transmission medium (in some embodiments, communication links 151) of access network 110. In other embodiments, the content distribution system 100 can be distributed; for example, content distribution system 100 can comprise a plurality of server systems 101 located in one or more headends. In further embodiments, an exemplary server system 101 can include a plurality of servers, controllers, and/or processors, e.g., for encoding and distributing video content.

Server system 101 receives, through access network 110, requests from a client system 130. Server system 101 and client system 130 exchange information with one another through access network 110; for example, a user interface (UI) server (not shown) of server system 101 can send information for presentation to a user 120, and the client system 130 can send to the server system 101 information, commands, and the like, received in a set-top box (such as STB 114) via an input device 112 from user 120. In an embodiment, each client system 130 can be associated with one or more users 120. For illustrative purposes, the receiving STB 114 is shown to be connected to an input device 112, and a display 116. Examples of display 116 include a television or a monitor. STB 114 is able to receive input commands from a corresponding input device 112 and send requests embodied in the input commands through access network 110 to server system 101. As depicted in FIG. 1, a user 120 can operate input device 112 to send commands to STB 114. For example, user 120 can use input device 112 to control a user interface (UI) application of STB 114 (e.g., for navigation and selection of content items from menus). Input device 112 is communicatively coupled to the STB 114 either via a wired or wireless connection. In some embodiments, input device 112 can be a remote control device. In further embodiments, input device 112 can be a computer (e.g., a desktop, laptop, notebook, or tablet computer), or a mobile device or smartphone, and/or can be completely or partially configured in the form of software running on a computer. In still further embodiments, input device 112 can be built into the STB 114. In an exemplary embodiment, upon receipt of input commands, such as changing to a new channel, the UI application can cause the STB 114 to send corresponding instructions upstream through access network 110 to server system 101.

In an illustrative embodiment, server system 101 can receive requests for content (e.g., from client system 130), interpret the requests, pull requested content (e.g., from a database), and deliver to client system 130 a content package corresponding to the requested content. For example, the content package can be delivered via a video processor (not shown) in server system 101 that prepares and sends the data through access network 110 following proper protocols.

STB 114 includes an MPEG decoder having a system time clock (STC) 160, which can be used, for example, for synchronization of MPEG streams. In an embodiment, STB 114 includes a clock that is counted by a 33 bit counter, which provides a base value of STC 160. In further embodiments, the 33 bit counter may be supplemented by an additional 9-bit value that may be used as an extension to STC 160.

It will be understood by a person having ordinary skill in the art that the terminology "set-top" does not in any way limit the physical placement of a set-top box such as STB 114. That is, a set-top box need not be positioned on top of a television set. Each set-top box is any suitable signal processing device or system for processing video signals, such as any signal converter or decoder (set-top) box, or other suitable computing device or video device with set-top box and/or cable modem capabilities, including a residential gateway, an internet protocol (IP), satellite or cable digital video recorder, a digital video disk (DVD) recorder, a computer, or a home media server system. In further embodiments, a set-top box can be a laptop, notebook, or tablet computer, or a mobile device, or can be built into the display 116. An exemplary set-top box comprises a computing device that connects the display 116 and an external signal source, turning the signal into a content stream that the display 116 is able to render and display. For example, an exemplary set-top box can convert data signals to audio/video content and output the data to display 116, and is communicatively coupled to the display 116 via a wired or wireless connection.

A set-top box can be completely or partially configured in the form of hardware circuitry and/or other hardware components within a larger device or group of components. Further, a set-top box can be partially configured in the form of software, e.g., as processing instructions or one or more sets of logic or computer code. In such configuration, the logic or processing instructions typically are stored in a data storage device, which typically is coupled to a processor or controller. Both the data storage device and the processor or controller can be included as part of a set-top box, although such is not necessary. The processor or controller accesses the necessary instructions from the data storage device and executes the instructions or transfers the instructions to the appropriate location within the set-top box.

Figure 2:
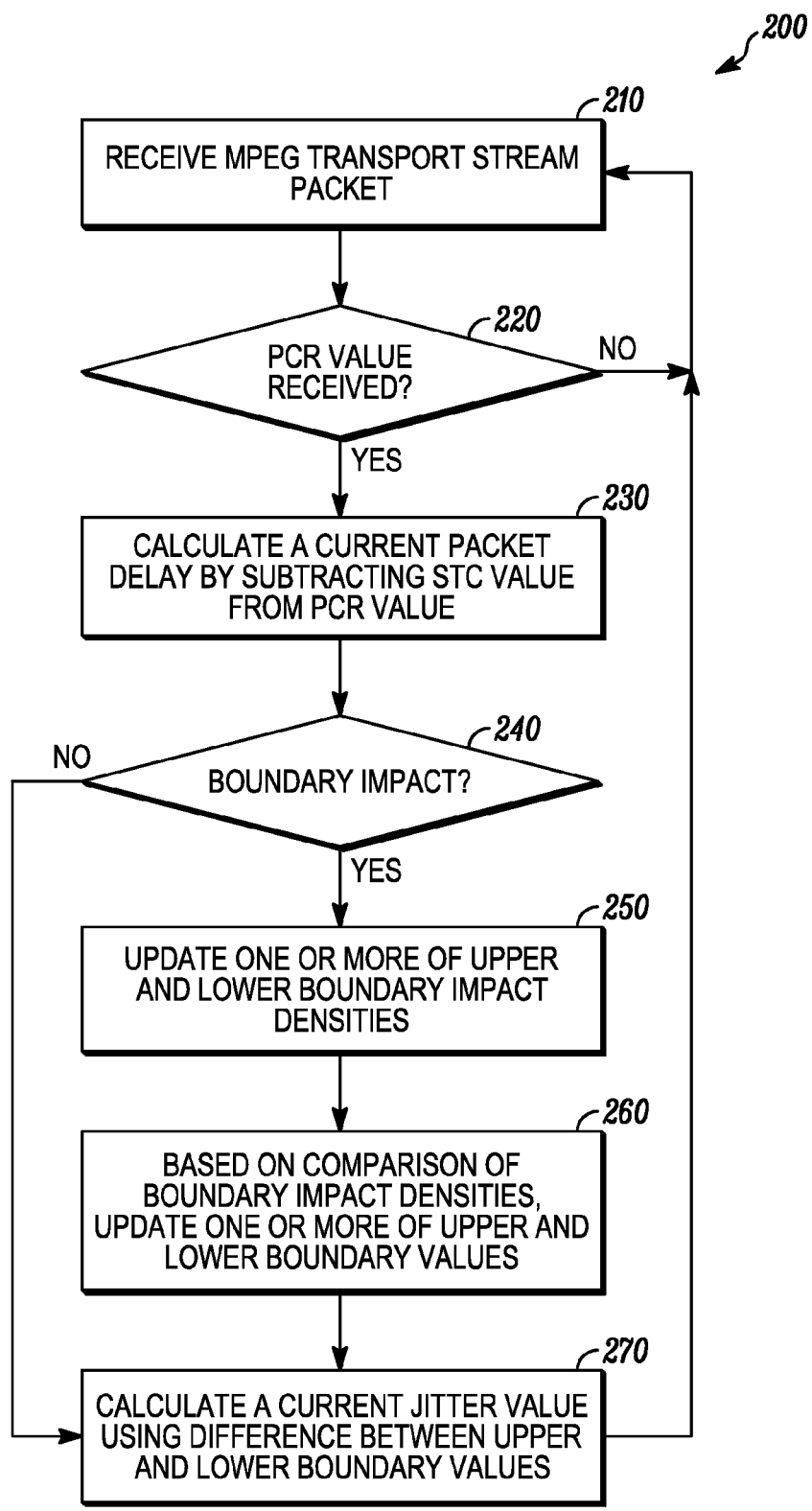
FIG. 2 is a flow diagram that illustrates a method for estimating jitter in an MPEG receiver according to an embodiment of the present invention.

FIG. 2 is a flow diagram that illustrates a method 200 for estimating jitter in an MPEG receiver according to an embodiment of the present invention.

In an exemplary embodiment, the method 200 is analogous to an answer to the following question: how could we embrace a stream of falling water and follow its movements to the left or right with our eyes closed? If we do the mental exercise we find this can actually be quite easy to accomplish. We would close both hands until we feel the water on both of them, and adjust so they barely touch the water. If the falling stream of water moves (for example) to the right, we feel the water only on our right hand and we may unconsciously move both hands to the right to keep the stream centered in between both hands.

In an illustrative embodiment, one can visualize a cloud of points that represent packet delay on the Y axis, and time on the X axis. This delay is measured by comparing a PCR value received in an MPEG transport stream to the local reference present in the MPEG receiver, the STC 160. The jitter can be represented by the width of this cloud in the Y axis, ignoring its long term tendency over time. In an exemplary calculation, jitter is maximum observed delay minus minimum observed delay, in a local time context. A long-term tendency to drift may be observed; such a tendency could be caused, for example, by clock drift between the stream source and the local clock in the receiver, and may be linear or non-linear.

As the water stream analogy shows, it is possible to have an estimation of the water stream width without measuring at which pace the water stream moves to the left or right. Similarly, an embodiment of a method 200 for jitter estimation maintains two boundaries (analogous to two hands), one tracking a maximum packet delay, and one tracking a minimum packet delay. An embodiment also keeps track of boundary impacts, defined as any measured packet delay that falls outside the boundaries.

In an embodiment, the boundary having higher impact density is analogous to the hand that is getting wet, and motivates a window shift to keep the cloud of points centered between the boundaries; the boundary having lower impact density senses jitter width, and reacts to impacts by widening the window. Such a strategy is able to get a very accurate estimation of PCR jitter that is independent of PCR to STC drift, using simple math operations (primarily comparisons, sums, and differences) for each PCR sample.

An illustrative set of instructions for performing an exemplary embodiment of method 200 is set forth in pseudo-code below:

```
for every PCR sample:
    high_boundary_impact = low_boundary_impact = false
    current_delay = per - stc
    if first PCR sample:
        delay_max = current_delay
        delay_min = current_delay
    if current_delay > delay_max:
        high_boundary_impact = true
    else
        high_boundary_impact = false
    if current_delay < delay_min:
        low_boundary_impact = true
    else
        low_boundary_impact = false
    update_boundary_impact_densities(high_boundary_impact,
            low_boundary_impact)
    if high_boundary_impact_density >
    low_boundary_impact_density:
        if high_boundary_impact:
            window_shift = current_delay - delay_max
```

-continued

```
        delay_max = delay_max + window_shift
        delay_min = delay_min + window_shift
    if low_boundary_impact:
        delay_min = current_delay
if low_boundary_impact_density >
high_boundary_impact_density:
    if high_boundary_impact:
        delay_max = current_delay
    if low_boundary_impact:
        window_shift = delay_min - current_delay
        delay_max = delay_max - window_shift
        delay_min = delay_min - window_shift
jitter = delay_max - delay_min
jitter_ms = (delay_max - delay_min) / 90
```

In an exemplary embodiment of illustrative method 200, an MPEG transport stream is received. For example, user 120 of receiving STB 114 uses input device 112 to select a channel or a content item (e.g., a movie or a television program) delivered from the server system 101 in the MPEG transport stream. The MPEG transport stream comprises a plurality of packets. In step 210, an MPEG transport stream packet is received.

Some of the packets include a PCR value. In step 220, the packet is checked for whether a PCR value is included in the received packet, so that steps can be performed for each PCR value received. If a PCR value is received, the method 200 proceeds to step 230. If a PCR value is not received, the method 200 returns to step 210 to receive another MPEG transport stream packet.

In step 230, a current packet delay is calculated by subtracting STC value 160 of the MPEG receiver from the PCR value. In an embodiment, the STC value 160 and the PCR value are 33 bit counters, referred to as $PCR_{base}$ and $STC_{base}$ in the MPEG specifications. The current packet delay is thus calculated in periods of a 90 KHz clock. There is an additional 9 bit extension to each counter that can be disregarded in some embodiments. However, in other embodiments, the additional 9 bits can be used to provide greater precision.

In some embodiments, for the first PCR value received in method 200, an upper boundary value and a lower boundary value are initialized to be equal to the initial current packet delay calculated in the first iteration of step 230.

In step 240, the method 200 determines whether a boundary impact has taken place. A boundary impact has taken place if the current packet delay is greater than the upper boundary value, or if the current packet delay is less than the lower boundary value. If a boundary impact has taken place, the method 200 proceeds to step 250. If a boundary impact has not taken place, the method 200 proceeds to step 270.

In step 250, one or more of an upper boundary impact density and a lower boundary impact density are updated. In an embodiment, if the current packet delay is greater than the upper boundary value, the upper boundary impact density is updated (for example, by incrementing the upper boundary impact density by an increment such as 1). In an embodiment, if the current packet delay is lower than the lower boundary value, the lower boundary impact density is updated (for example, by incrementing the lower boundary impact density by an increment such as 1).

In order to react to clock drift changes in direction, an embodiment must consider a time-limited window of impact history for computing boundary impact densities. In an illustrative embodiment, a density integration counter is maintained and incremented each time the boundary impact densities are updated. If the density integration counter is greater than a predetermined density integration window value, the density integration counter and the upper boundary impact density and the lower boundary impact density are reset to zero. An illustrative example of a predetermined density integration window value is a constant value such as 32; however, other suitable values will be apparent to those skilled in the art, based on a tradeoff wherein larger values result in a longer time required to react to clock drift changes in direction, while smaller values result in more frequent resets, with reduced accuracy after each reset while samples of boundary impacts are accumulated.

In further embodiments, the upper and lower boundary impact densities can be updated using any of various methods able to keep track of number of impacts per unit of time on the upper and lower boundaries separately. There is no need to maintain these densities in any particular unit, as long as they can be compared to find which one is higher. An illustrative set of instructions for a simple exemplary procedure for calculating boundary impact densities is set forth in pseudo-code below:

```
DENSITY_INTEGRATION_WINDOW = 32
density_integration_counter = 0
high_boundary_impact_density = 0
low_boundary_impact_density = 0
update_boundary_impact_density(high_boundary_impact,
low_boundary_impact):
    density_integration_counter = density_integration_counter + 1
    if density_integration_counter >
    DENSITY_INTEGRATION_WINDOW:
        density_integration_counter = 0
        high_boundary_impact_density = 0
        low_boundary_impact_density = 0
    if high_boundary_impact:
        high_boundary_impact_density =
            high_boundary_impact_density + 1
    if low_boundary_impact:
        low_boundary_impact_density =
            low_boundary_impact_density + 1
```

In step 260, based on a comparison of the upper boundary impact density to the lower boundary impact density, one or more of the upper boundary value and the lower boundary value are updated. An illustrative embodiment of updating one or more of the upper boundary value and the lower boundary value is described below with reference to FIG. 3.

In step 270, a current jitter value is calculated using the difference between the upper boundary value and the lower boundary value. In an embodiment, the jitter value, expressed in periods of a 90 KHz clock, is the upper boundary value minus the lower boundary value.

In a further embodiment, a current jitter value expressed in milliseconds is obtained by dividing the difference between the upper boundary value and the lower boundary value by 90. In some embodiments of method 200, this division by 90 is the only division, and it is only relevant for translating the data to milliseconds; accordingly, if the current jitter value does not need to be presented in readable form, the step of division can be removed. An exemplary embodiment without division operations can allow for extremely efficient implementation on embedded devices with CPU constraints, and also on devices with no floating point capabilities.

In some embodiments, the current jitter value can be used for dynamically adapting the size of an internal buffer (e.g., a dejitter buffer) of the MPEG receiver, e.g., by continuously adjusting dejitter buffer sizes.

In another embodiment, dynamically adapting can be performed after a channel change to a selected channel, and before a first video frame of the selected channel is displayed.

In a further embodiment, dynamically adapting can be performed for a current channel after a glitch due to streaming data unavailability.

Figure 3:
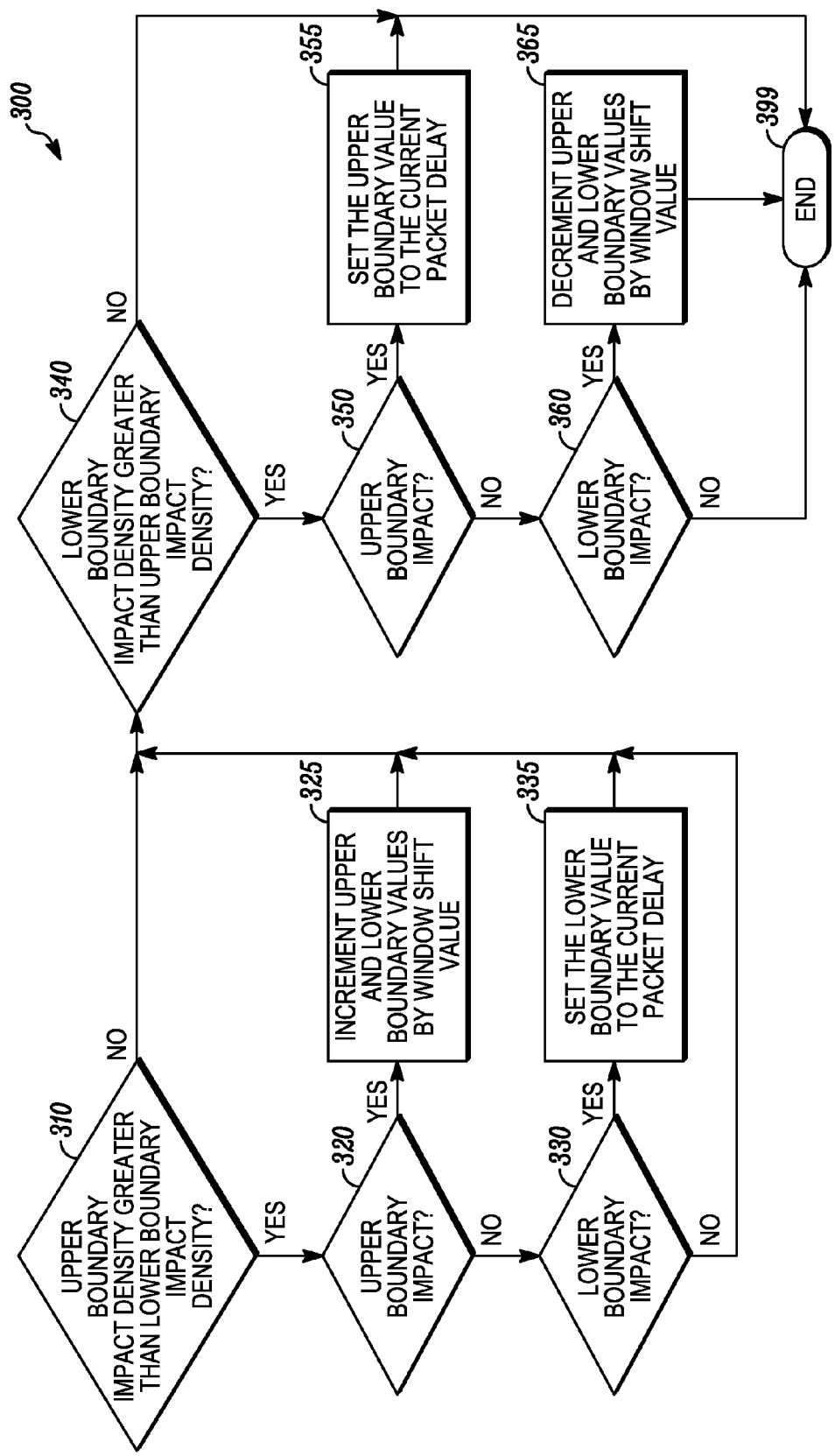
FIG. 3 is a flow diagram that illustrates method steps for updating one or more of the upper boundary value and the lower boundary value according to an embodiment of the present invention.

FIG. 3 is a flow diagram that illustrates method steps 300 for updating one or more of the upper boundary value and the lower boundary value according to an embodiment of the present invention.

An illustrative embodiment of updating one or more of the upper boundary value and the lower boundary value is described as follows. At step 310, if the upper boundary impact density is greater than the lower boundary impact density, then the method 300 proceeds to step 320; otherwise, the method 300 proceeds to step 340.

At step 320, if the current packet delay is greater than the upper boundary value (i.e., an upper boundary impact), the method 300 proceeds to step 325; otherwise, the method 300 proceeds to step 330. At step 325, the upper boundary value and the lower boundary value are incremented by a window shift value; the method 300 then proceeds to step 340.

At step 330, if the current packet delay is less than the lower boundary value (i.e., a lower boundary impact), the method 300 proceeds to step 335; otherwise, the method 300 proceeds to step 340. At step 335, the lower boundary value is set to the current packet delay; the method 300 then proceeds to step 340.

In step 340, if the lower boundary impact density is greater than the upper boundary impact density, the method 300 proceeds to step 350; otherwise, the method 300 terminates at step 399.

In step 350, if the current packet delay is greater than the upper boundary value (i.e., an upper boundary impact), the method 300 proceeds to step 355; otherwise, the method 300 proceeds to step 360. At step 355, the upper boundary value is set to the current packet delay, and the method terminates at step 399.

In step 360, if the current packet delay is less than the lower boundary value (i.e., a lower boundary impact), the method 300 proceeds to step 365; otherwise, the method 300 terminates at step 399. At step 365, the upper boundary value and the lower boundary value are decremented by the window shift value, and the method terminates at step 399.

In a further illustrative embodiment, the window shift value is determined as follows. If the upper boundary impact density is greater than the lower boundary impact density, the window shift value is calculated by subtracting the upper boundary value from the current packet delay. If the lower boundary impact density is greater than the upper boundary impact density, the window shift value is calculated by subtracting the current packet delay from the lower boundary value.

Figure 4:
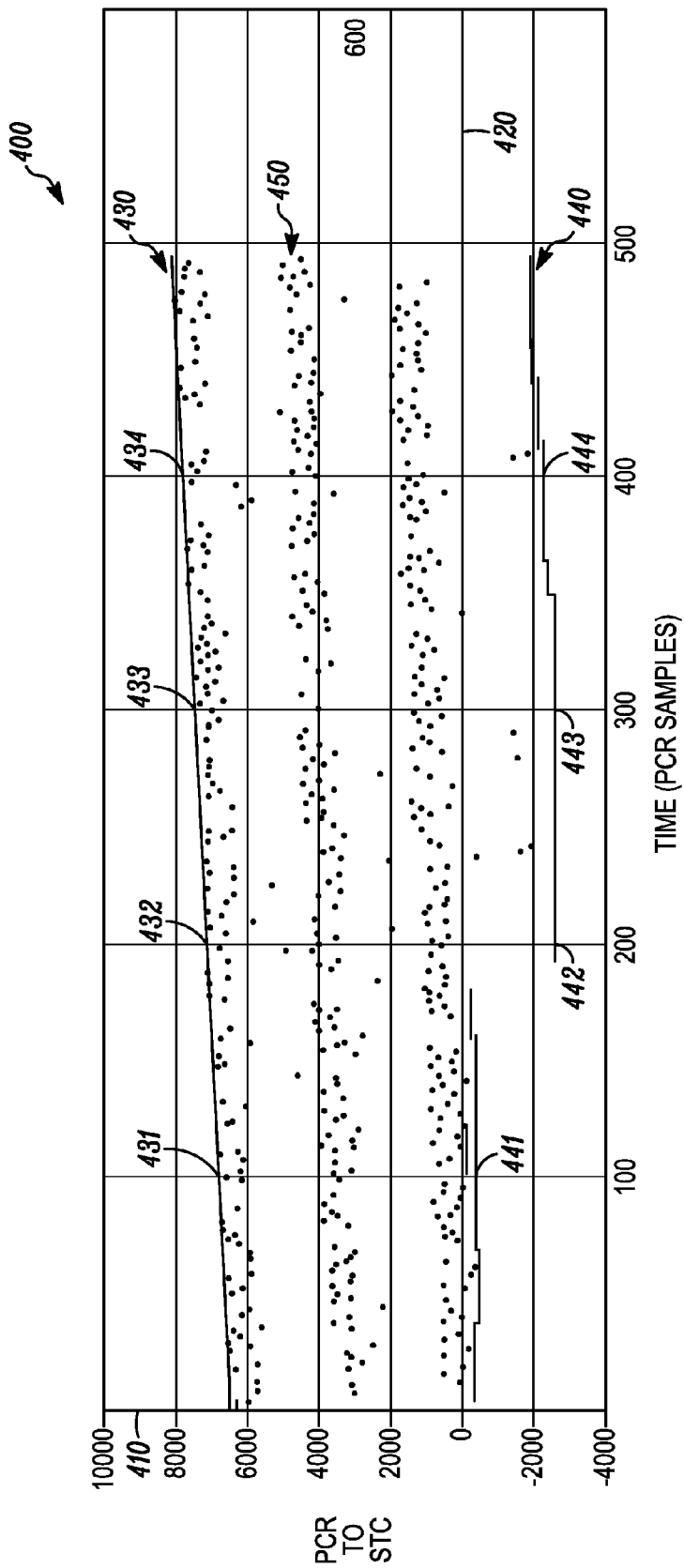
FIG. 4 is a graph that illustrates exemplary results from estimating jitter in an MPEG receiver according to an embodiment of the present invention.

FIG. 4 is a graph 400 that illustrates exemplary results from estimating jitter in an MPEG receiver according to an embodiment of the present invention.

In the illustrative example of graph 400, a cloud of points 450 represent observed PCR delay (e.g., each point represents a current packet delay), as measured by an Internet Protocol television (IPTV) set-top box on an access network comprising an operative IPTV broadcasting environment of a service provider. Results during an exemplary standard definition H.264 video transmission for an end user are depicted. PCR to STC differences are represented along the Y axis 410, and time (i.e., PCR samples) is represented on the X axis 420.

As the graph 400 shows, there is a clear tendency of the cloud of points 450 to drift upwards. This represents a source to receiver clock drift where the source is faster than the receiver. For illustrative purposes in the present example, clock compensation has been disabled on the receiver to show how an embodiment adapts to varying drift tendencies. If clock compensation were enabled on the receiver, the observed drift would not be linear, and would blend downwards until the entire cloud evolved toward perfectly horizontal.

The depicted environment is a high jitter environment (>100 ms), and it can be seen that clock drift cannot be derived easily in just a few samples. In the exemplary environment depicted in graph 400, the clock drift becomes visually apparent within approximately fifty samples (e.g., the leftmost points of the cloud of points 450).

In graph 400, jitter boundary values, as estimated by an embodiment, are shown as jagged or discontinuous horizontal lines. Upper boundary values 430 appear above the cloud of points, and lower boundary values 440 appear below the cloud of points. In the illustrated example, graph 400 depicts an upper boundary value 431 and a lower boundary value 441 at a sampled PCR time value of 100 shown on the X axis 420, an upper boundary value 432 and a lower boundary value 442 at a sampled PCR time value of 200 shown on the X axis 420, an upper boundary value 432 and a lower boundary value 442 at a sampled PCR time value of 300 shown on the X axis 420, and an upper boundary value 434 and a lower boundary value 444 at a sampled PCR time value of 400 shown on the X axis 420.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for estimating jitter in an MPEG receiver, the method comprising:

receiving an MPEG transport stream comprising a plurality of packets, wherein at least one of the plurality of packets comprises a program clock reference (PCR) value; and for each PCR value received:

calculating a current packet delay by subtracting a system time clock (STC) value of the MPEG receiver from the PCR value;

if the current packet delay is greater than an upper boundary value, updating an upper boundary impact density or if the current packet delay is less than a lower boundary value, updating a lower boundary impact density comparing the upper boundary impact density and the lower boundary impact density;

if the upper boundary impact density is greater than the lower boundary impact density, and if the current packet delay is greater than the upper boundary value, incrementing the upper boundary value and the lower boundary value by a window shift value;

if the upper boundary impact density is greater than the lower boundary impact density, and if the current packet delay is less than the lower boundary value, setting the lower boundary value to the current packet delay;

if the lower boundary impact density is greater than the upper boundary impact density, and if the current packet delay is greater than the upper boundary value, setting the upper boundary value to the current packet delay;

if the lower boundary impact density is greater than the upper boundary impact density, and if the current packet delay is less than the lower boundary value, decrementing the upper boundary value and the lower boundary value by the window shift value; and calculating a current jitter value using a difference between the upper boundary value and the lower boundary value.

2. The method of claim 1 wherein if the upper boundary impact density is greater than the lower boundary impact density, the window shift value is calculated by subtracting the upper boundary value from the current packet delay.

3. The method of claim 1 wherein if the lower boundary impact density is greater than the upper boundary impact density, the window shift value is calculated by subtracting the current packet delay from the lower boundary value.

4. The method of claim 1 further comprising:
for a first PCR value received, calculating an initial current packet delay by subtracting the STC value of the MPEG receiver from the PCR value; and
setting the upper boundary value and the lower boundary value equal to the initial current packet delay.

5. The method of claim 1 further comprising, for each PCR value received:
if the current packet delay is greater than the upper boundary value, recognizing an upper boundary impact; and
if the current packet delay is lower than the lower boundary value, recognizing a lower boundary impact.

6. The method of claim 1 wherein updating the upper boundary impact density or the lower boundary impact density comprises:
incrementing the upper boundary impact density when the current packet delay is greater than the upper boundary value; and
incrementing the lower boundary impact density when the current packet delay is lower than the lower boundary value.

7. The method of claim 1 wherein updating the upper boundary impact density or the lower boundary impact density comprises:
incrementing a density integration counter;
if the density integration counter is greater than a predetermined density integration window value, resetting the density integration counter and the upper boundary impact density and the lower boundary impact density to zero.

8. The method of claim 1 further comprising:
using the current jitter value, dynamically adapting a size of an internal buffer of the MPEG receiver.

9. The method of claim 8 wherein the step of dynamically adapting is performed after a channel change to a selected channel, and before a first video frame of the selected channel is displayed.

10. The method of claim 8 wherein the step of dynamically adapting is performed for a current channel after a glitch due to streaming data unavailability.

11. A non-transitory computer-readable medium comprising instructions for estimating jitter in an MPEG receiver, which, when executed by a processor, cause the processor to perform steps comprising:
receiving an MPEG transport stream comprising a plurality of packets, wherein at least one of the plurality of packets comprises a program clock reference (PCR) value; and
for each PCR value received:
calculating a current packet delay by subtracting a system time clock (STC) value of the MPEG receiver from the PCR value;
if the current packet delay is greater than an upper boundary value, updating an upper boundary impact density or if the current packet delay is less than a lower boundary value, updating a lower boundary impact density
comparing the upper boundary impact density and the lower boundary impact density;
if the upper boundary impact density is greater than the lower boundary impact density, and if the current packet delay is greater than the upper boundary value, incrementing the upper boundary value and the lower boundary value by a window shift value;
if the upper boundary impact density is greater than the lower boundary impact density, and if the current packet delay is less than the lower boundary value, setting the lower boundary value to the current packet delay;
if the lower boundary impact density is greater than the upper boundary impact density, and if the current packet delay is greater than the upper boundary value, setting the upper boundary value to the current packet delay;
if the lower boundary impact density is greater than the upper boundary impact density, and if the current packet delay is less than the lower boundary value, decrementing the upper boundary value and the lower boundary value by the window shift value; and
calculating a current jitter value using a difference between the upper boundary value and the lower boundary value.

12. The non-transitory computer-readable medium of claim 11, the steps further comprising:
for a first PCR value received, calculating an initial current packet delay by subtracting the STC value of the MPEG receiver from the PCR value; and
setting the upper boundary value and the lower boundary value equal to the initial current packet delay.

* * * * *